June 2, 1970   P. HABSCHEIDT ETAL   3,514,986
COOLING MEANS FOR EXTRUDED MATERIAL
Filed May 31, 1967   2 Sheets-Sheet 1

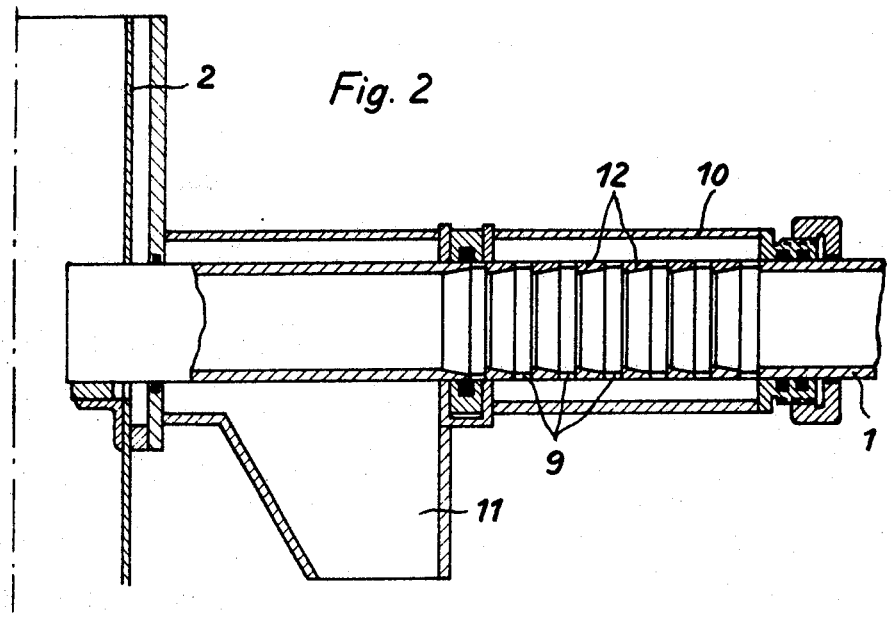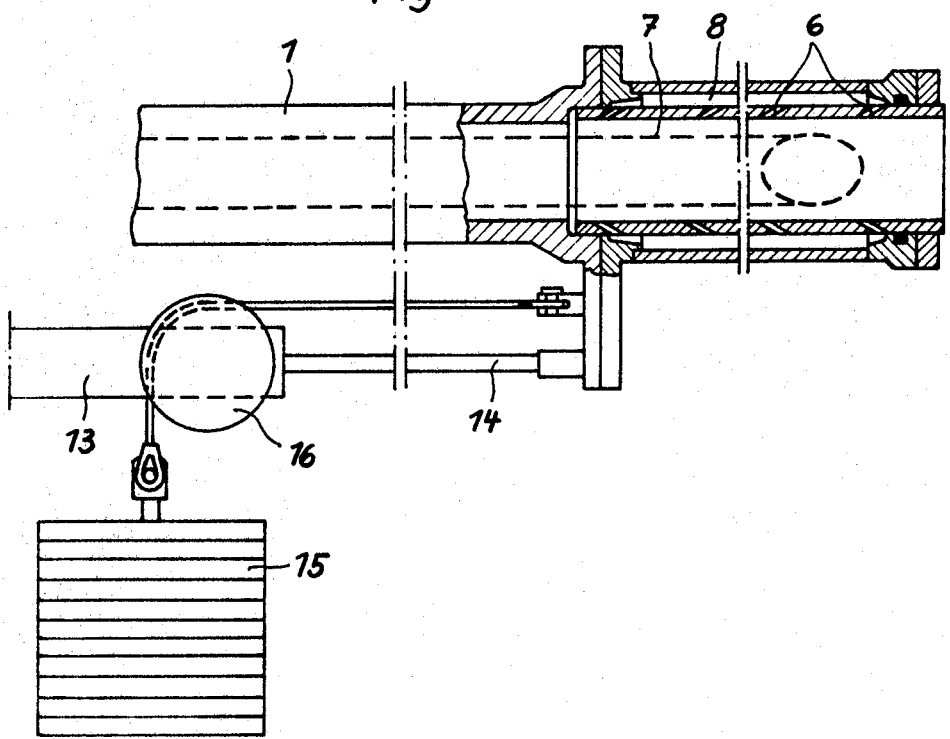

United States Patent Office 3,514,986
Patented June 2, 1970

3,514,986
COOLING MEANS FOR EXTRUDED MATERIAL
Peter Habscheidt, Dusseldorf, and Helmut Robra, Mulheim (Ruhr), Germany, assignors to Schloemann Aktiengesellschaft, Dusseldorf, Germany, a German company
Filed May 31, 1967, Ser. No. 642,414
Claims priority, application Germany, June 2, 1966, Sch 39,058
Int. Cl. B21c 23/00
U.S. Cl. 72—253         1 Claim

ABSTRACT OF THE DISCLOSURE

Means, including an open tank of liquid, for cooling an extruded product, particularly copper or copper alloys, issuing from a horizontal extrusion press, comprising a horizontal tubular extension connecting the tank and the die, below the surface level of the liquid in the tank, and spraying nozzles, inclined in the direction of motion of the extruded product. The tubular extension is preferably axially displaceable, and is provided with outlet apertures, between conically tapering annular shoulders, surrounded by a closure piece. The tank is preferably equipped with evenly spaced guiding bodies for an extruded product, and with ejecting means for lifting an extruded product out of the tank.

---

This invention relates to cooling means, connected to follow a horizontal extrusion press, and comprising a liquid-container or tank for cooling the extruded material, particularly copper or alloys of copper.

It is known, in extrusion presses, to provide, immediately beyond the die, cavity guides, through which the extruded material passes. These guides serve primarily to surround the extruded material, for the purpose of preventing oxidation by atmospheric air, with a protective sheath of gas, and at the same time also to obtain a quenching effect by sprinkling with water.

The cavity guides were frequently constructed as a double-jacketed tube for the supply of cooling water, with bores in the inner jacket, through which the cooling water impinges vertically upon the extruded material.

With such cooling tubes the inner tube has sometimes been made axially displaceable, in which case, on the side facing the die, a conically tapering annular space between the outer and inner tubes is obtained, which is variable by the axial displacement, and the jet of liquid issuing here can be influenced in its direction. The axial mobility of such cooling tubes has already been employed also for scavenging or expelling the die.

Moreover a cooling appliance is known in which the extruded material, after passing through a chamber filled with protective gas, is guided by a hollow guide into a cooling space, in which water is directed on to the product, and flows, substantially in the direction of motion of the product, to an outlet, in which case the product issuing from the die is withdrawn with the help of the cooling liquid.

All these known devices have however the disadvantage that a complete prevention of oxidation, connected with a corresponding quenching effect, cannot be obtained.

The object of the present invention is to obtain, in horizontal extrusion presses, an oxide-free extrusion, particularly of copper and copper alloys, wherein the extruded material, right up to complete cooling, can be guided in a straight line, so as obviate a subsequent expensive de-scaling and pickling of the extruded material before the drawing process.

According to the invention this object is attained by providing a liquid-container or tank, on the die side of the latter, and underneath its liquid surface, with a horizontally extending tubular extension, forming a connecting member to the tools of the extrusion press, and by providing, on this extension, spraying nozzles pointing in the direction of motion of the extruded material, for the purpose of obtaining a head of liquid within the extension.

There is thus produced, by the construction according to the invention of the tubular extension of the tank to the tools of the extrusion press, a head of liquid, whereby the liquid that is located within the liquid surface of the tank in the tubular connecting member, is prevented from flowing further towards the die and thereby causing any disturbance there.

Now the advantage of the arrangement according to the invention resides in the fact that the extruded material immediately beyond the die, even in the case of horizontal extrusion presses, wherein an atmosphere of protective gas can in any case be passed in a known manner, can be completely immersed in the cooling liquid, and guided in it, underneath the surface of the liquid, in a straight line, throughout its entire length, into the cooling-medium tank. By this means, as contrasted with the spraying pipes hitherto known, in which the individual jets of liquid, when they impinge upon the hot extruded material, also partly evaporate, protection against oxidation is obtained dtogether with a correspondingly rapid quenching effect, such as has hitherto not been attainable.

In an advantageous development of the invention, the tubular extension to the liquid-container is arranged in an axially displaceable manner, and is provided with outlet apertures for the cooling liquid, which, in the operative position of the cooling apparatus, are surrounded by a closure piece. In this case the closure piece surrounding the part of the extension that is provided with outlet apertures for the cooling liquid is formed by a stationarily arranged closed piece of tubing.

When the tubular extension is out of operation, the outlet apertures for the cooling liquid cooperate with a discharge chamber for the cooling liquid.

The inoperative position is established, in a convenient further development of the invention, by an axial displacement of the tubular extension towards the tank. In this case, the outlet apertures provided in the extension, which, in the operative position, open into a closure piece surrounding the extension and sealed from the exterior, are displaced into an outlet chamber, whereby the cooling liquid can flow away downwards, without flowing towards the die.

In another advantageous development of the invention, the internal surface of that part of the tubular extension that contains the outlet apertures is provided with annular steps or shoulders, tapering conically in the direction of the tank, the outlet apertures for the cooling liquid being provided between the individual steps or shoulders By this means the advantageous result is firstly obtained that the extruded material, or at least its leading end, receives, upon the conically tapering annular surfaces, a marked guidance over the individual outlet apertures. In the second place, the steplike shoulders between the outlet apertures, when the cooling apparatus is out of operation, contribute materially to the braking of the flow of liquid towards the die, and to the guidance of the liquid into the outlet apertures.

In yet another development of the invention, the axially displaceable extension is connected, by way of deflecting rollers, with counterweights that tend to draw it towards its inoperative position. The operative position of the tubular extension is however obtained by means of power appliances actuated by pressure fluid, against the pull of the counterweights, the extension being pressed against that side of the extrusion press at which the extruded material leaves it.

Upon failure of current, for example, that is, failure of the pumps that provide the spraying nozzles with cooling liquid, the power appliance actuated by pressure fluid also fails, in which case the counterweights then draw back the tubular extension towards the liquid-container, whereupon the outlet apertures of the tubular extension surrounded by the closure piece cooperate with an outlet chamber for the cooling medium.

In another advantageous development of the invention, guiding bodies, open upwards, for the extruded material, are arranged in the tank at the level of the extension, and are provided with a coating of graphite. These guiding bodies extend throughout the length of the cooling-medium tank at uniform distances from one another, the arms of an ejector, formed of a system of levers, engaging in the spaces between them. In order to facilitate the transport of the extruded material through the cooling-medium tank, a positively driven pressure-applying roller, adjustable in height, cooperates with a loosely running counter-roller, arranged at the level of the guiding bodies.

The graphite coating provided in the guiding bodies advantageously permits, on the ground of its insensitiveness to temperature and its low coefficient of friction, the guidance of the extrusion material within the cooling-medium container, whilst the vertically adjustable driven pressure-applying roller, in cooperation with the counter-roller, the peripheral surface of which is located at about the level of the lower guide, also assists this guidance.

The ejectors, cooperating in a system of levers, enable the extruded material, in its entire length, to be simultaneously lifted out of the tank in a very convenient manner, owing to the uniformly spaced arrangement, without distorting the extrusion material, and without emptying the liquid-container.

One embodiment of the invention is illustrated by way of example in the accompanying drawings, in which:

FIGS. 2 and 3 show the two ends of the tubular extension, partly in section.

Figure 1:
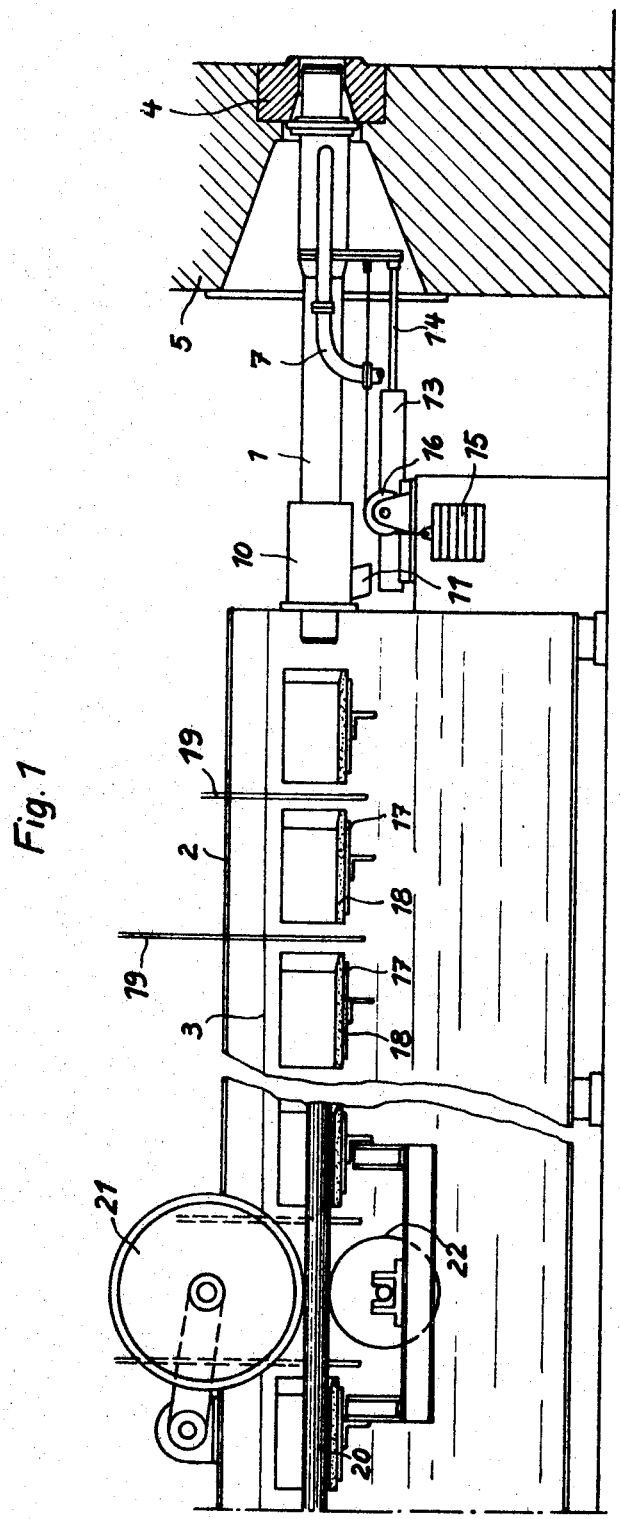
FIG. 1 shows a general view of the constructional example.

The horizontal tubular extension 1 of a liquid-container or tank 2 is arranged on the said tank below the surface level 3 of the liquid, and on a level with the tools 4 of a horizontal extrusion press 5. In the end portion of the tubular extension 1 adjacent to the tools 4 are provided, round the entire periphery of the extension, spraying nozzles 6 pointing in the direction of motion of the extrusion material. Through these spraying nozzles 6 cooling liquid flows under a high pressure by way of supply tubes 7 and an annular space 8, whereby, in the tubular extension 1, a head of liquid is produced, which prevents the liquid in the tank 2, which is standing, with its surface level 3 above the horizontal tubular extension 1, from flowing in the direction of the tools 4.

The tubular extension 1 is axially displaceable on the tank 2, and is provided, over part of its length, with outlet apertures 9, which, in the operative position, are surrounded by an encircling closure piece 10, formed from a stationary length of pipe In an inoperative position, an axial displacement of the tubular extension 1 is effected in the direction of the tank 2, the outlet apertures 9 for the cooling liquid co-operating with a cooling-liquid outlet chamber 11, and the liquid being able to flow downwards in a manner which is not harmful to the extrusion press 5 and the tools 4.

The internal surface of the tubular extension 1 is provided, upon the part of its length containing the outlet apertures 9, with annual steps or shoulders 12 tapering conically in the direction towards the tank 2, the outlet apertures 9 for the cooling liquid being provided between the individual shoulders 12.

The operative position of the tubular extension 1 is brought about by power appliances 13 actuated by fluid under pressure, which are supported for instance on the frame of the tank 2. These appliances, by means of their pistons 14, press the tubular extension 1 sealingly against the tools 4 of the extrusion press 5, for instance against the pressure plate of the bolster.

In the inoperative position, which may for instance be brought about by failure of current, the power appliance 13, actuated by fluid pressure, drops out of action, and counter-weights 15, which are connected with the tubular extension 1 by cords or other tensile flexible members passing over deflecting pulleys 16, bring about an axial displacement of the extension 1 towards the tank 2. In this case a residue of the liquid still located in the extension 1 can flow away through the open end into an outflow aperture, not shown, on the extrusion press 5.

In the tank 2, throughout its length, at the level of the extension 1, guiding bodies 17 open upwards are arranged at uniform distances apart, and are each provided with a graphite wiring 18. In the interstices between the guiding bodies 17 there engage ejectors 19, connected by a system of levers not shown, for the purpose of lifting the extrusion material 20 out of the tank 2.

To facilitate the transport of the extrusion material 20, a positively driven pressure-applying roller 21, adjustable in height, is provided in the liquid-container 2, and co-operates with a freely running counter-roller 22, the upper rolling surface of which is located at the level of the guiding path of the guiding bodies 17, or of the graphite coating 18.

We claim:

1. For use in conjunction with a horizontal metal-extrusion press having a die, particularly for the extrusion of copper and copper alloys, means for cooling the extruded metal, comprising: an open-topped tank for cooling liquid, a horizontal, axially displaceable, open-ended tubular extension connecting the tank with the press at a level below the surface level of the liquid in the tank, and adapted to bear with one end against the die of the press, annularly arranged spraying nozzles near said one end of the tubular extension, pointing in the direction of extrusion, for impelling liquid into the tubular extension to build up a head of liquid therein, thereby preventing the escape of liquid therefrom into the die, at least one pulling means, such as a flexible cord attached by one end to the tubular extension, a counter-weight attached to the other end of the cord, and a pulley over which the cord passes, to urge the tubular extension constantly away from the press and towards the tank, a hydraulic cylinder-and-piston unit for impelling the tubular extension towards the press and holding it against the die while extrusion is being effected, against the pull of the pulling means, a portion of the tubular extension located not far from the tank being formed with outlet apertures, a stationary tubular closure member surrounding this portion of the tubular extension when extrusion is being effected, and an outlet chamber into which the said outlet apertures can discharge when the hydraulic cylinder-and-piston unit is inoperative and the tubular extension has been shifted away from the press by the pulling means.

References Cited

UNITED STATES PATENTS

| | | | |
|---|---|---|---|
| 2,287,830 | 6/1942 | Postlewaite | 264—178 |
| 3,277,656 | 10/1966 | Bill et al. | 264—180 |
| 3,295,163 | 1/1967 | Bachus. | |
| 3,057,013 | 10/1962 | Loveless | 264—178 |
| 1,739,620 | 12/1929 | Summey | 72—257 |
| 2,925,909 | 2/1960 | Worlidge | 72—257 |

FOREIGN PATENTS

| | | |
|---|---|---|
| 657,959 | 10/1951 | Great Britain. |
| 718,077 | 11/1954 | Great Britain. |
| 942,685 | 7/1949 | Germany. |
| 955,096 | 4/1964 | Great Britain. |
| 691,875 | 12/1950 | Great Britain. |
| 878,626 | 7/1949 | Germany. |

CHARLES W. LANHAM, Primary Examiner

A. LEE HAVIS, Assistant Examiner

U.S. Cl. X.R.

72—257, 342